(12) United States Patent
Chang et al.

(10) Patent No.: US 8,331,569 B2
(45) Date of Patent: *Dec. 11, 2012

(54) METHOD FOR GENERATING DOWNLINK FRAME, AND METHOD FOR SEARCHING CELL

(75) Inventors: Kap Seok Chang, Daejeon (KR); Il Gyu Kim, Okcheon-Gun (KR); Hyeong Geun Park, Daejeon (KR); Young Jo Ko, Daejeon (KR); Hyo Seok Yi, Daejeon (KR); Moon Sik Lee, Daejon (KR); Young Hoon Kim, Daejeon (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 505 days.

This patent is subject to a terminal disclaimer.

(21) Appl. No.: 12/488,234

(22) Filed: Jun. 19, 2009

(65) Prior Publication Data
US 2009/0252333 A1    Oct. 8, 2009

Related U.S. Application Data

(63) Continuation of application No. PCT/KR2008/004095, filed on Jul. 11, 2008.

(30) Foreign Application Priority Data

| Jul. 12, 2007 | (KR) | 10-2007-0070086 |
| Aug. 17, 2007 | (KR) | 10-2007-0082678 |
| Aug. 21, 2007 | (KR) | 10-2007-0083916 |
| Jul. 10, 2008 | (KR) | 10-2008-0066782 |

(51) Int. Cl.
*H04K 1/00* (2006.01)

(52) U.S. Cl. ........ 380/287; 370/350; 370/503; 370/509; 370/208; 370/324; 455/502

(58) Field of Classification Search .................. 370/350, 370/503, 509, 208, 324; 455/502; 380/287
See application file for complete search history.

(56) References Cited

U.S. PATENT DOCUMENTS 6,822,999 B1    11/2004    Lee et al.
(Continued)

FOREIGN PATENT DOCUMENTS

CN    1957539    5/2007
(Continued)

OTHER PUBLICATIONS

ETRI, "Comparison of S-SCH mapping methods," 3GPP TSG WG1 #50bis, R1-074052 (2007).

(Continued)

*Primary Examiner* — April Shan
(74) *Attorney, Agent, or Firm* — Nelson Mullins Riley & Scarborough LLP; EuiHoon Lee, Esq.

(57) ABSTRACT

The present invention relates to a method for generating a downlink frame includes: generating a first short sequence and a second short sequence indicating cell group information; generating a first scrambling sequence determined by a first synchronization signal; generating a second scrambling sequence determined by a group to which the first short sequence belongs, the wireless communication system using a plurality of short sequences and the plurality of short sequence being divided into a plurality of groups; scrambling the first short sequence with the first scrambling sequence; scrambling the second short sequence with at least the second scrambling sequence; and mapping a second synchronization signal including the scrambled first short sequence and the scrambled second short sequence in the frequency domain.

14 Claims, 7 Drawing Sheets

U.S. PATENT DOCUMENTS

| | | | |
|---|---|---|---|
| 6,888,880 B2 | 5/2005 | Lee et al. | |
| 7,158,595 B2 | 1/2007 | Yang et al. | |
| 7,161,988 B2 | 1/2007 | Lee et al. | |
| 7,221,695 B1 | 5/2007 | Hwang et al. | |
| 7,236,468 B2 | 6/2007 | Ryu et al. | |
| 7,386,055 B2 | 6/2008 | Morita et al. | |
| 7,969,964 B2 * | 6/2011 | Kim et al. | 370/350 |
| 8,125,976 B2 * | 2/2012 | Chang et al. | 370/350 |
| 2002/0044538 A1 | 4/2002 | Lee | |
| 2003/0193922 A1 | 10/2003 | Ho et al. | |
| 2005/0088987 A1 | 4/2005 | Ryu | |
| 2006/0062185 A1 | 3/2006 | Darwood et al. | |
| 2006/0114812 A1 | 6/2006 | Kim et al. | |
| 2006/0146867 A1 | 7/2006 | Lee et al. | |
| 2006/0209670 A1 | 9/2006 | Gorokhov et al. | |
| 2008/0019314 A1 | 1/2008 | Gorokhov et al. | |
| 2008/0019350 A1 | 1/2008 | Onggosanusi et al. | |
| 2008/0107086 A1 | 5/2008 | Fukuta et al. | |
| 2008/0212462 A1 | 9/2008 | Ahn et al. | |
| 2008/0273522 A1 | 11/2008 | Luo et al. | |
| 2008/0285433 A1 | 11/2008 | Akita et al. | |
| 2008/0291945 A1 | 11/2008 | Luo | |
| 2009/0067370 A1 | 3/2009 | Kim et al. | |
| 2009/0086669 A1 | 4/2009 | McCoy et al. | |
| 2009/0310782 A1 | 12/2009 | Dabak et al. | |
| 2009/0323642 A1 | 12/2009 | Tanno et al. | |
| 2011/0009138 A1 | 1/2011 | Kim et al. | |

FOREIGN PATENT DOCUMENTS

| | | |
|---|---|---|
| EP | 1453232 A1 | 9/2004 |
| KR | 1020060037101 | 5/2006 |
| KR | 1020070025944 | 3/2007 |
| KR | 1020070039760 | 4/2007 |
| KR | 1020070050338 | 5/2007 |
| WO | WO-2005/043791 A2 | 5/2005 |
| WO | 2006/134829 A1 | 12/2006 |
| WO | 2007/055526 A1 | 5/2007 |
| WO | 2007/073116 A1 | 6/2007 |
| WO | WO-2009/008679 A2 | 1/2009 |
| WO | WO-2009/014354 A1 | 1/2009 |

OTHER PUBLICATIONS

ETRI, "S-SCH Scrambling Methods," 3GPP TSG RAN WG1 Meeting #50bis, R1-074053 (2007).

Marvell Semiconductor, "SSCH Mapping to Group ID and Frame Timing," 3GPP TSG RAN WG1 #50bis, R1-074485 (2007).

Motorola, "Scrambling Method for Two S-SCH Short Code," 3GPP TSG RAN WG1 Meeting #49bis, R1-072661 (2007).

NTT DoCoMo, Mitsubishi Electric, Sharp, Toshiba Corporation, "S-SCH Structure for E-UTRA Downlink," 3GPP TSG RAN WG1 Meeting #49, R1-072598 (2007).

ZTE, "Scrambling Method for S-SCH," 3GPP TSG-RAN WG1 #49bis, R1-072910 (2007).

Supplementary European Search Report for Application No. 08778878.2, dated Feb. 15, 2010.

MCC Support, "Draft Report of 3GPP TSG RAN WG1 #49b v0.3.0," 3GPP TSG RAN WG1 Meeting #50, R1-073815, 4 pages (2007).

Motorola, "Cell Search E-mail Reflector Summary," 3GPP TSG RAN1#50, R1-073401, 1 page (2007).

Nortel, "Scrambling Code Designs for S-SCH," 3GPP TSG-RAN WG1 Meeting #50, R1-073307, 6 pages (2007).

ETRI, "Design of S-SCH sequences," 3GPP TSG RAN1 WG1 #49bis, R1-072811, 5 pages (2007).

NTT DoCoMo et al., "S-SCH Structure for E-UTRA Downlink," 3GPP TSG RAN WG1 Meeting #49bis, R1-072941, 6 pages (2007).

NTT DoCoMo et al., "Scrambling Method for S-SCH in E-UTRA Downlink," 3GPP TSG RAN WG1 Meeting #49bis, R1-072940, 4 pages, (2007).

Ericsson, "Information mapping on the Secondary Synchronization Signal," 3GPP TSG-RAN WG 1 Meeting #50, R1-073736, 12 pages, (2007).

LG Electronics, "Time-domain PSC design using Zadoff-Chu sequence," 3GPP TSG RAN WG1 #48 bis, R1-071530, 13 references, (2007).

* cited by examiner secondary synchronization channel of slot 0 secondary synchronization channel of slot 10

: sequence 1

: sequence 3

: sequence 2

: sequence 4 secondary synchronization
channel of slot 0 secondary synchronization
channel of slot 10

: sequence 1

: sequence 3

: sequence 2

: sequence 4 secondary synchronization channel of slot 0 secondary synchronization channel of slot 10

▨ : sequence 1   ▧ : sequence 3
▦ : sequence 2   ▩ : sequence 4

METHOD FOR GENERATING DOWNLINK FRAME, AND METHOD FOR SEARCHING CELL

CROSS-REFERENCE TO RELATED APPLICATION

This application is a continuation of PCT application No. PCT/KR2008/004095, filed on Jul. 11, 2008, which claims priority to and the benefit of Korean Patent Application No. 10-2007-0070086 filed on Jul. 12, 2007, Korean Patent Application No. 10-2007-0082678 filed on Aug. 17, 2007, Korean Patent Application No. 10-2007-0083916 filed on Aug. 21, 2007, Korean Patent Application No. 10-2008-0066782 filed on Jul. 10, 2008, the entire contents of which are incorporated herein by reference.

BACKGROUND (a) Field

The present invention relates to a downlink frame generation method and a cell search method, and particularly relates to a method for generating a downlink frame and a method for searching a cell by using the downlink frame in an orthogonal frequency division multiplexing (OFDM)-based cellular system.

(b) Description of the Related Art

In a direct sequence code division multiple access (DS-CDMA) system, the code hopping method is applied to a pilot channel in order to acquire cell synchronization and appropriate cell identification information. The code hopping method introduces a code hopping technique to the pilot channel so that a terminal may easily search the cell without an additional synchronization channel. However, since the number of channels that are distinguishable by the frequency domain in the symbol interval is much greater than the number of channels that are distinguishable by the CDMA spread in one time domain symbol interval in the OFDM system, the usage of the time domain may waste resources with respect to capacity, and hence it is difficult to apply the code hopping method to the pilot channel time domain of the OFDM-based system. Therefore, it is desirable in the OFDM case to search cells by efficiently using the received signals in the time domain and the frequency domain.

A conventional technique for searching cells in the OFDM system includes divide a frame into four time blocks and allocating synchronization information and cell information. The technique proposes two frame structures. The first frame structure allocates synchronization recognition information, cell group recognition information, appropriate cell recognition information, and synchronization recognition information to four time blocks. The second frame structure allocates synchronization recognition information and appropriate cell recognition information to the first time block and the third time block, and synchronization recognition information and cell group recognition information to the second time block and the fourth time block.

In the case of following the first scheme, since symbol synchronization is acquired in the first time block, it is impossible to acquire fast synchronization within the standard of 5 ms when a terminal is turned on or in the case of a handover between heterogeneous networks. Also, it is difficult to acquire a diversity gain through accumulation of synchronization recognition information for fast synchronization acquisition.

In the case of following the second scheme, the cell search process is complicated and it is difficult to search the cells quickly since it is required to acquire synchronization and simultaneously correlate appropriate cell recognition information or cell group recognition information so as to acquire frame synchronization.

Another method for searching cells using an additional preamble to acquire synchronization and search the cells has been proposed, but it is inapplicable to a system having no preamble. Further, since the preamble is disposed at the front part of the frame, the terminal must stand by for the next frame when attempting to acquire synchronization at a time position other than the first time position of the frame. Particularly, when the terminal performs a handover among the GSM mode, the WCDMA mode, and the 3GPP LTE mode, it must acquire the initial symbol synchronization within 5 msec, but the initial symbol synchronization may not be acquired within 5 msec since the synchronization can be acquired for each frame.

SUMMARY

The present invention has been made in an effort to provide a downlink frame generating method for averaging interference between sectors, and an efficient cell searching method by receiving the downlink frame.

An exemplary embodiment of the present invention provides a method for generating a downlink frame including a first synchronization signal and a second synchronization signal in a wireless communication system includes: generating a first short sequence and a second short sequence indicating cell group information; generating a first scrambling sequence determined by the first synchronization signal; generating a second scrambling sequence determined by a group to which the first short sequence belongs, the wireless communication system using a plurality of short sequences, and the plurality of short sequences being divided by a plurality of groups; scrambling the first short sequence with the first scrambling sequence, and scrambling the second short sequence with at least the second scrambling sequence; and mapping a second synchronization signal including the scrambled first short sequence and the scrambled second short sequence in the frequency domain.

Another embodiment of the present invention provides a method for generating a downlink frame including a first synchronization signal and a second synchronization signal in a wireless communication system includes: generating a first short sequence and a second short sequence indicating cell group information; generating a first scrambling sequence determined by the first synchronization signal; generating a second scrambling sequence determined by a group to which the first short sequence belongs and a third scrambling sequence determined by a group to which the second short sequence belongs, the wireless communication system using a plurality of short sequences, and the plurality of short sequences being divided by a plurality of groups; scrambling the first short sequence with the first scrambling sequence, and scrambling the second short sequence with at least the second scrambling sequence; scrambling the second short sequence with the first scrambling sequence, and scrambling the first short sequence with at least the third scrambling sequence; and mapping one second synchronization signal including the first short sequence scrambled with the first scrambling sequence and at least the second short sequence scrambled with the second scrambling sequence and another second synchronization signal including the second short sequence scrambled with the first scrambling sequence and the first short sequence scrambled with at least the third scrambling sequence in the frequency domain.

Yet another embodiment of the present invention provides a device for generating a downlink frame including a first synchronization signal and a second synchronization signal in a wireless communication system includes: a sequence generator for generating a first short sequence and a second short sequence indicating cell group information, a first scrambling sequence determined by the first synchronization signal, and a second scrambling sequence determined by a group to which the first short sequence belongs, the wireless communication system using a plurality of short sequences, and the plurality of short sequences being divided by a plurality of groups; and a synchronization signal generator for scrambling the first short sequence with the first scrambling sequence, scrambling the second short sequence with at least the second scrambling sequence, and generating one second synchronization signal including the scrambled first short sequence and the scrambled second short sequence.

According to an embodiment of the present invention, a recording medium for recording a program for performing a method of generating a downlink frame including a first synchronization signal and a second synchronization signal includes: generating a first short sequence and a second short sequence indicating cell group information; generating a first scrambling sequence determined by the first synchronization signal; generating a second scrambling sequence determined by a group to which the first short sequence belongs, the wireless communication system using a plurality of short sequences, and the plurality of short sequences being divided into a plurality of groups; scrambling the first short sequence with the first scrambling sequence, and scrambling the second short sequence with at least the second scrambling sequence; and mapping a second synchronization signal including the scrambled first short sequence and the scrambled second short sequence in the frequency domain.

According to an embodiment of the present invention, a recording medium for recording a program for performing a method for generating a downlink frame including a first synchronization signal and a second synchronization signal includes: generating a first short sequence and a second short sequence indicating cell group information; generating a first scrambling sequence determined by the first synchronization signal; generating a second scrambling sequence determined by a group to which the first short sequence belongs and a third scrambling sequence determined by a group to which the second short sequence belongs, the wireless communication system using a plurality of short sequences, and the plurality of short sequences being divided into a plurality of groups; scrambling the first short sequence with the first scrambling sequence, and scrambling the second short sequence with at least the second scrambling sequence; scrambling the second short sequence with the first scrambling sequence, and scrambling the first short sequence with at least the third scrambling sequence; and mapping one second synchronization signal including the first short sequence scrambled with the first scrambling sequence and the second short sequence scrambled with at least the second scrambling sequence and another second synchronization signal including the second short sequence scrambled with the first scrambling sequence and the first short sequence scrambled with at least the third scrambling sequence in the frequency domain.

According to the present invention, cell search performance is improved by scrambling a short sequence with a scrambling sequence and reducing interference between sectors.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. For clarification of drawings in the present invention, parts that are not related to the description will be omitted, and the same part will have the same reference sequence throughout the specification.

Throughout the specification, unless explicitly described to the contrary, the word "comprise" and variations such as "comprises" or "comprising", will be understood to imply the inclusion of stated elements but not the exclusion of any other elements. Also, the terms of a unit, a device, and a module in the present specification represent a unit for processing a predetermined function or operation, which can be realized by hardware, software, or combination of hardware and software.

A downlink frame and a synchronization channel of an OFDM system according to an exemplary embodiment of the present invention will now be described with reference to FIG. 1 to FIG. 3.

Figure 1:
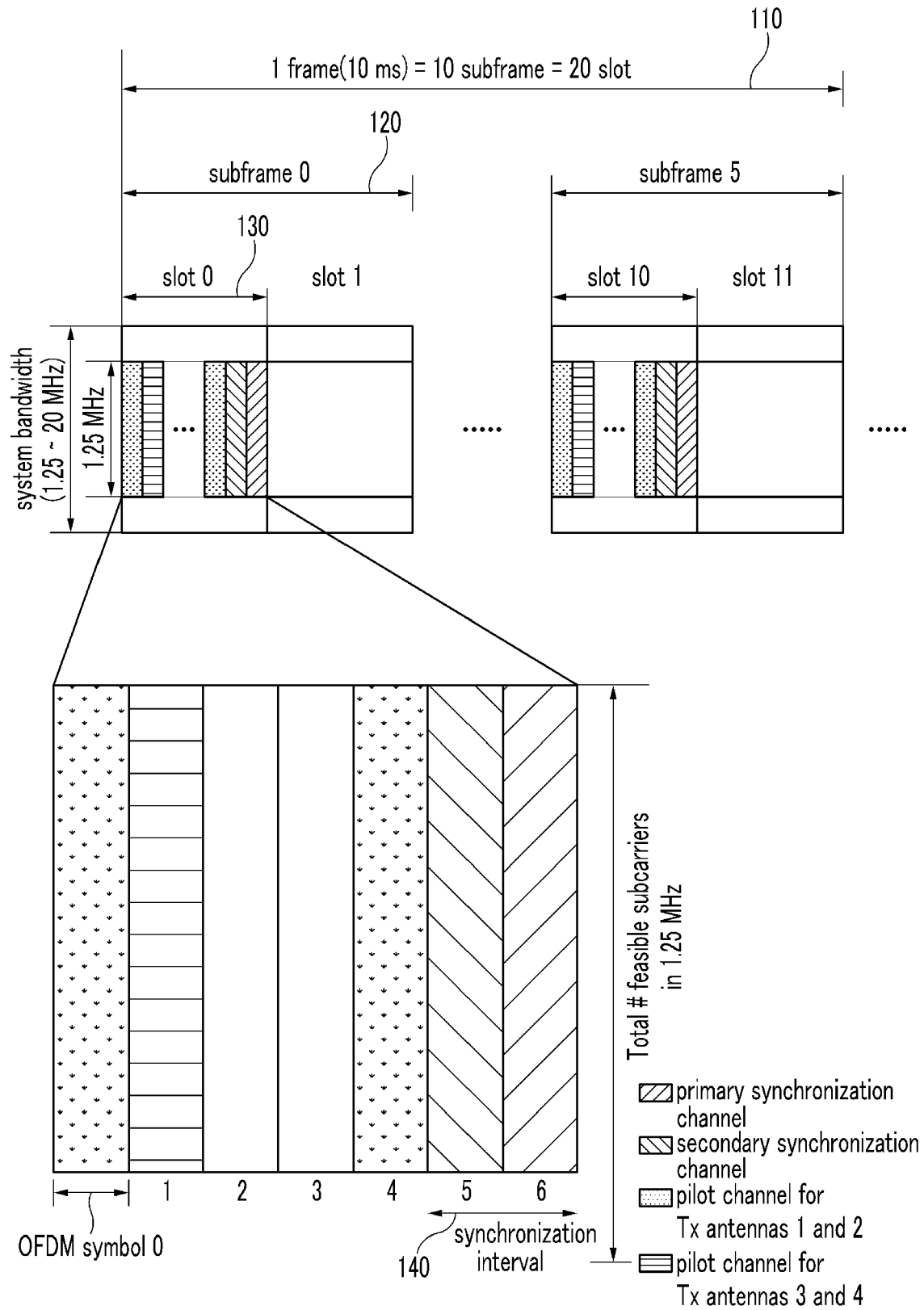
FIG. 1 shows a downlink frame of an OFDM system according to an exemplary embodiment of the present invention.

FIG. 1 shows a downlink frame of an OFDM system according to an exemplary embodiment of the present invention. In FIG. 1, the horizontal axis represents the time axis, and the vertical axis represents the frequency axis or a subcarrier axis.

As shown in FIG. 1, a downlink frame 110 according to an exemplary embodiment of the present invention has a time interval of 10 msec and includes ten subframes 120. One subframe 120 has a time interval of 1 msec and includes two slots 130, and one slot 130 includes six or seven OFDM symbols. When one slot includes six symbols, it has a cyclic prefix length that is greater than the case in which one slot includes seven symbols.

As shown in FIG. 1, one downlink frame 110 according to an exemplary embodiment of the present invention includes one synchronization interval 140 at the slot 0 and the slot 10 respectively, to thus include two synchronization intervals 140. However, the embodiment of the present invention is not restricted to this. That is, one downlink frame 110 may include a synchronization interval at a random slot, and may include one or at least three synchronization intervals. Also, since the length of the cyclic prefix may be different for each slot, it is desirable to provide the synchronization interval to the last position of the slot.

Each slot includes a pilot interval.

A synchronization interval according to an exemplary embodiment of the present invention includes a primary synchronization channel and a secondary synchronization channel, and the primary synchronization channel and the secondary synchronization channel are disposed adjacently with respect to time. As shown in FIG. 1, a primary synchronization channel is provided to the last position of the slot, and a secondary synchronization channel is provided before the primary synchronization channel.

The primary synchronization channel includes information for identifying symbol synchronization and frequency synchronization, and some cell ID (identification) information, and the secondary synchronization channel includes information for identifying other cell ID information and frame synchronization. The mobile station identifies the cell ID through combination of cell ID information of the primary and secondary synchronization channels.

For example, when there are 510 cell IDs, three primary synchronization signals are allocated to the primary synchronization channel to divide the entire 510 cell IDs into three groups, and when 170 secondary synchronization signals are allocated to the secondary synchronization channel, the entire 510 cell ID information (3×170=510) can be expressed.

Further, it is also possible to divide the 510 cell IDs into 170 groups by using the 170 secondary synchronization signals allocated to the secondary synchronization channel, and express the cell ID information in the cell groups by using the three primary synchronization signals allocated to the primary synchronization channel.

Since the secondary synchronization channel includes information for identifying frame synchronization as well as cell ID information, two secondary synchronization channels included in one frame are different.

Figure 2:
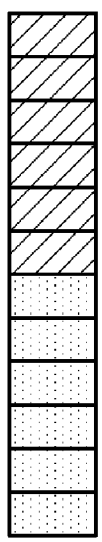
FIG. 2 shows a synchronization channel configuration diagram indicating a secondary synchronization channel when two sequences are mapped on the frequency domain in a centralized manner.
Figure 2:
Figure 2:
Figure 2:
Figure 2:
Figure 2:
Figure 3:
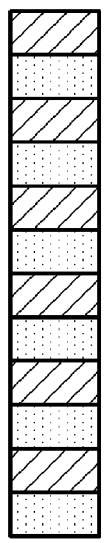
FIG. 3 shows a synchronization channel configuration diagram indicating a secondary synchronization channel when two sequences are mapped on the frequency domain in a distributive manner.
Figure 3:
Figure 3:
Figure 3:
Figure 3:
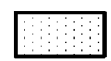
Figure 3:
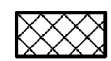

FIG. 2 shows a synchronization channel configuration diagram indicating a secondary synchronization channel when two sequences are mapped on the frequency domain in a centralized manner, and FIG. 3 shows a synchronization channel configuration diagram indicating a secondary synchronization channel when two sequences are mapped on the frequency domain in a distributive manner.

Referring to FIG. 2 to FIG. 3, a secondary synchronization signal inserted into a secondary synchronization channel according to an exemplary embodiment of the present invention is configured by a combination of two sequences. Cell group information and frame synchronization information are mapped on the two sequences.

As shown in FIG. 2, it is possible to allocate the first sequence to the subcarrier and sequentially allocate the second sequence to the other subcarrier, and as shown in FIG. 3, it is possible to allocate the first sequence to every even subcarrier (n=0, 2, 4, and ... 60) and the second sequence to every odd subcarrier (n=1, 3, 5, and ... 61).

The length of sequence is half the number of subcarriers allocated to the secondary synchronization channel. That is, the number of elements of the sequence that can be generated is as many as half the number of subcarriers allocated to the secondary synchronization channel. For example, when the number of subcarriers allocated to the secondary synchronization channel is 62, the length of the sequence is 31, and up to 31 elements of the sequence can be generated.

Therefore, since two sequences are allocated to one secondary synchronization channel, 961 (=31×31) secondary synchronization signals are generated. However, since the information to be included by the secondary synchronization channel includes cell group information and frame boundary information, 170 or 340 (=170×2) secondary synchronization signals are needed. That is, 961 is sufficiently greater than 170 or 340.

Figure 4:
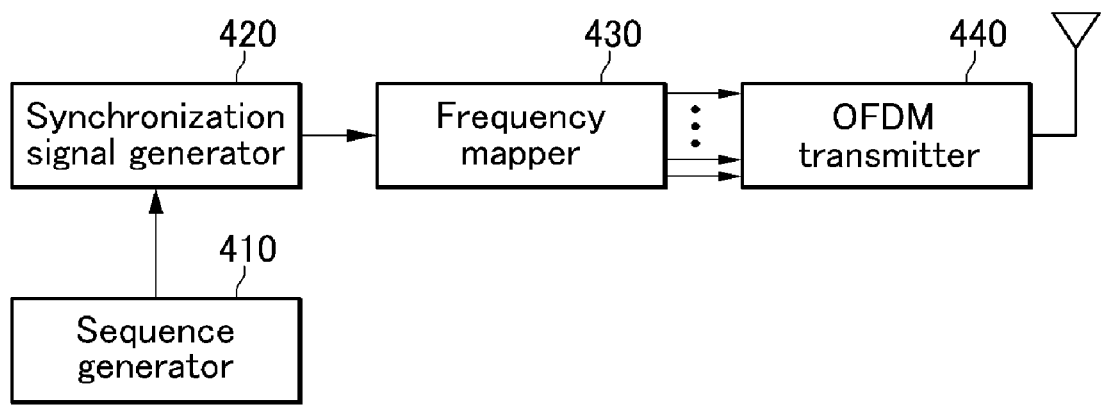
FIG. 4 shows a block diagram of a downlink frame generating device according to an exemplary embodiment of the present invention.

A downlink frame generating device according to an exemplary embodiment of the present invention will now be described with reference to FIG. 4. FIG. 4 shows a block diagram of a downlink frame generating device according to an exemplary embodiment of the present invention.

As shown in FIG. 4, the downlink frame generating device includes a sequence generator 410, a synchronization signal generator 420, a frequency mapper 430, and an OFDM transmitter 440.

The sequence generator 410 generates a time and frequency synchronization acquiring sequence, a cell identifying sequence, a plurality of short sequences, and an adjacent cell interference reducing scrambling sequence, and transmits them to the synchronization signal generator 420.

The synchronization signal generator 420 generates a primary synchronization signal, a secondary synchronization signal, and a pilot pattern by using the sequences transmitted by the sequence generator 410.

The synchronization signal generator 420 generates a primary synchronization signal by using a time and frequency synchronization acquiring sequence and a cell identifying sequence. The synchronization signal generator 420 generates a secondary synchronization signal by using a plurality of short sequences and an adjacent cell interference reducing scrambling sequence.

The synchronization signal generator 420 generates a pilot pattern of a downlink signal by allocating a proper scrambling sequence that is allocated for each cell to the pilot channel so as to encode a common pilot symbol and a data symbol of the cellular system.

The frequency mapper 430 maps the primary synchronization signal, the secondary synchronization signal, and the pilot pattern generated by the synchronization signal generator 420, and frame control information and transmission traffic data provided from the outside in the time and frequency domains to generate a downlink frame.

The OFDM transmitter 440 receives the downlink frame from the frequency mapper 430 and transmits it through a transmitting antenna.

Figure 5:
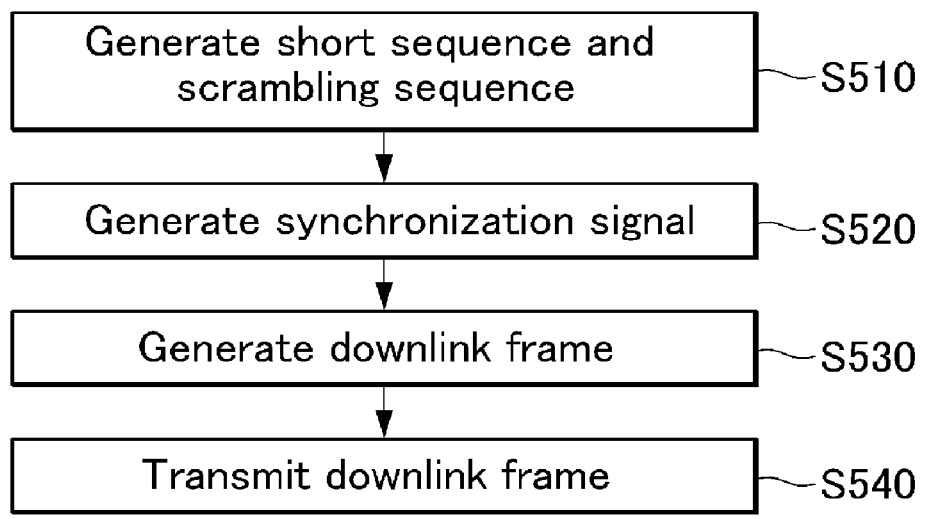
FIG. 5 shows a flowchart of a downlink frame generating method according to an exemplary embodiment of the present invention.

A downlink frame generating method according to an exemplary embodiment of the present invention will now be described with reference to FIG. 5 to FIG. 7. FIG. 5 shows a flowchart of a downlink frame generating method according to an exemplary embodiment of the present invention.

As shown in FIG. 5, the sequence generator 410 generates a plurality of short sequences and a plurality of adjacent cell interference reducing scrambling sequences and transmits them to the synchronization signal generator 420 (S510).

The synchronization signal generator 420 generates a secondary synchronization signal by using the short sequences and the adjacent cell interference reducing scrambling sequences transmitted by the sequence generator 410 (S520). The exemplary embodiment of the present invention will exemplify the frame including two secondary synchronization channels, but is not limited thereto.

Two secondary synchronization signal generating methods according to an exemplary embodiment of the present invention will now be described with reference to FIG. 6 and FIG. 7. FIG. 6 shows a first method for generating a secondary synchronization signal according to an exemplary embodiment of the present invention, and FIG. 7 shows a second method for generating a secondary synchronization signal according to an exemplary embodiment of the present invention.

A short sequence (wn) is a binary sequence (binary code) indicating cell group information. That is, the short sequence (wn) is a binary sequence allocated for the cell group number and the frame synchronization, and its length is half the number of subcarriers allocated to the secondary synchronization channel. The exemplary embodiment of the present invention describes the case in which the number of subcarriers allocated to the secondary synchronization channel symbol is 62, but is not limited thereto. Therefore, the length of the short sequence according to the exemplary embodiment of the present invention is 31.

The first short sequence (w0) is a sequence allocated to the even subcarrier of the first (slot 0) secondary synchronization channel and is expressed in Equation 1.

$$w0=[w0(0), w0(1), \ldots, w0(k), \ldots, w0(30)] \quad \text{[Equation 1]}$$

Here, k represents an index of the even subcarrier used for the synchronization channel.

The second short sequence (w1) is a sequence allocated to the odd subcarrier of the first (slot 0) secondary synchronization channel and is expressed in Equation 2.

$$w1=[w1(0), w1(1), \ldots, w1(m), \ldots w1(30)] \quad \text{[Equation 2]}$$

Here, m represents an index of the odd subcarrier used for the synchronization channel.

The third short sequence (w2) is a sequence allocated to the even subcarrier of the second (slot 10) secondary synchronization channel and is expressed in Equation 3.

$$w2=[w2(0), w2(1), \ldots, w2(k), \ldots, w2(30)] \quad \text{[Equation 3]}$$

The fourth short sequence (w3) is a sequence allocated to the odd subcarrier of the second (slot 10) secondary synchronization channel and is expressed in Equation 4.

$$w3=[w3(0), w3(1), \ldots, w3(m), \ldots w3(30)] \quad \text{[Equation 4]}$$

w0, w1, w2, and w3 may be different sequences from each other, and it may be that w0=w3 and w1=w2, or it may be that w0=w2 and w1=w3. When it is given that w0=w3 and w1=w2, the short sequences of the second secondary synchronization channel can be allocated by using the short sequences allocated to the first synchronization channel, and a terminal only needs to memorize the 170 short sequences allocated to the first secondary synchronization channel and thereby reduce the complexity.

Figure 6:
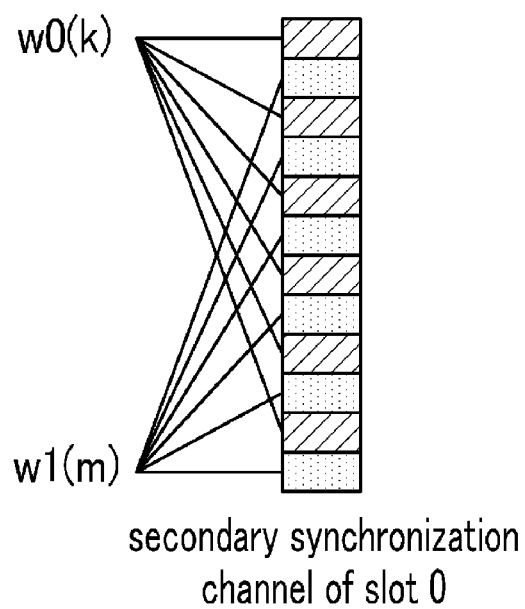
FIG. 6 shows a method for generating a secondary synchronization signal according to a first exemplary embodiment of the present invention.
Figure 6:
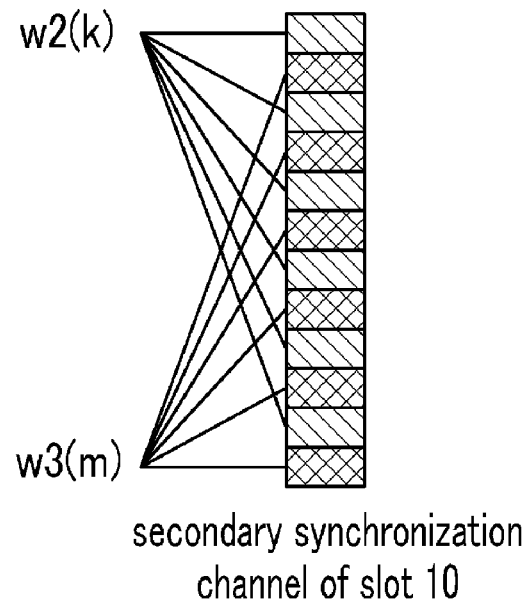

The first method for generating the secondary synchronization signal is to allocate the first short sequence to every even subcarrier of the first secondary synchronization channel and the second short sequence to every odd subcarrier of the first secondary synchronization channel as shown in FIG. 6. The first method is then to allocate the third short sequence to every even subcarrier of the second secondary synchronization channel and the fourth short sequence to every odd subcarrier of the second secondary synchronization channel.

According to the first method for generating the secondary synchronization signal, since the secondary synchronization signal is generated by the combination of two short sequences with the length of 31, the number of the secondary synchronization signals becomes 961 which is sufficiently greater than the required number of 170 or 340.

Figure 7:
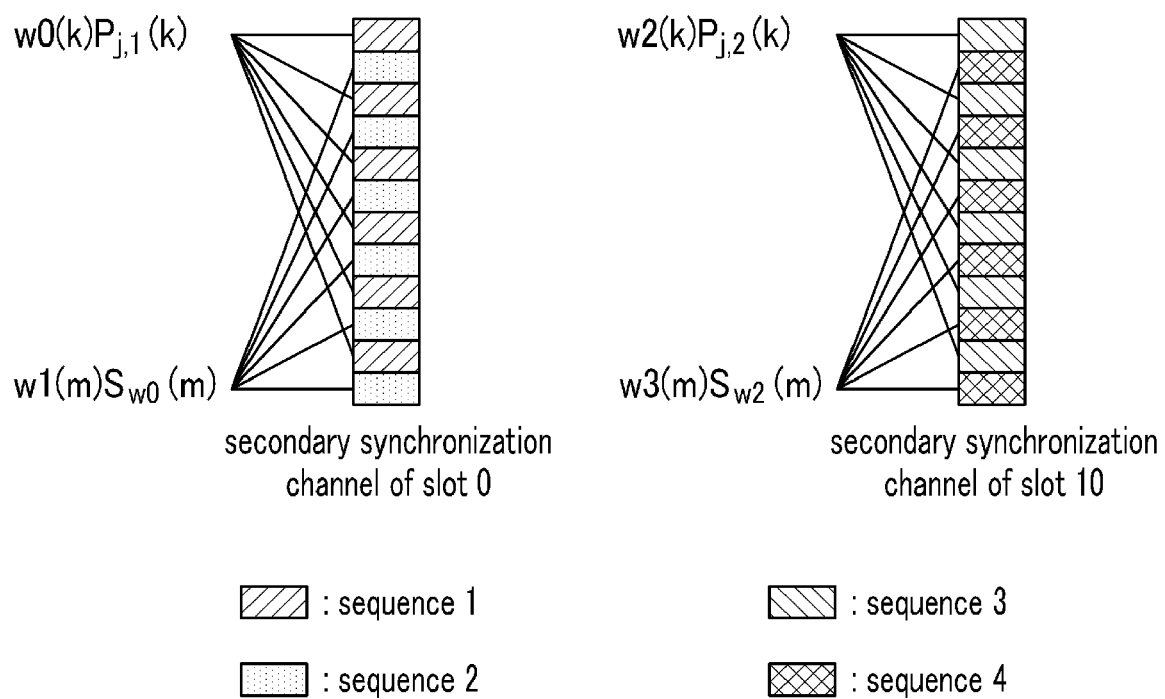
FIG. 7 shows a method for generating a secondary synchronization signal according to a second exemplary embodiment of the present invention.

The second method for generating the secondary synchronization signal is to allocate the first sequence determined by Equation 5 to every even subcarrier of the first (slot 0) secondary synchronization channel, and the second sequence determined by Equation 6 to every odd subcarrier of the first (slot 0) secondary synchronization channel, as shown in FIG. 7. The second method also includes allocating the third sequence determined by Equation 7 to every even subcarrier of the second (slot 10) secondary synchronization channel, and the fourth sequence determined by Equation 8 to every odd subcarrier of the second (slot 10) secondary synchronization channel.

A scrambling sequence $P_{j,1}$ for scrambling the first short sequence w0 is given as $P_{j,1}=[P_{j,1}(0), P_{j,1}(1), \ldots P_{j,1}(k) \ldots P_{j,1}(30)]$, and j (j=0, 1, 2) is a number of a cell identifying sequence allocated to the primary synchronization channel. Therefore, $P_{j,1}$ is determined by the primary synchronization signal. $P_{j,1}$ is a known value when the mobile station demaps the sequence in order to know the cell ID group and the frame boundary.

As expressed in Equation 5, respective elements of the first sequence $c_0$ according to the second method for generating the secondary synchronization signal are products of respective elements of the first short sequence w0 and respective corresponding elements of $P_{j,1}$.

$$c_0=[w0(0)P_{j,1}(0), w0(1)P_{j,1}(1), \ldots, w0(k)P_{j,1}(k), \ldots, w0(30)P_{j,1}(30)] \quad \text{[Equation 5]}$$

Here, k is an index of the even subcarrier used for the synchronization channel.

A scrambling sequence $S_{w0}$ for scrambling the second short sequence w1 is given as $S_{w0}=[S_{w0}(0), S_{w0}(1), \ldots, S_{w0}(m), \ldots, S_{w0}(30)]$, and $S_{w0}$ is determined by the first short sequence (w0).

In this instance, it is possible to determine $S_{w0}$ according to the short sequence group to which the first short sequence belongs by combining the short sequences into a group.

For example, since the length of the short sequence is 31 in the exemplary embodiment of the present invention, there are 31 short sequences. Therefore, the 0 to 7 short sequences are set to belong to the group 0, the 8 to 15 short sequences are set to belong to the group 1, the 16 to 23 short sequences are set to belong to the group 2, and the 24 to 30 short sequences are set to belong to the group 3, a scrambling code is mapped on each group, and the scrambling code mapped on the group to which the first short sequence belongs is determined to be $S_{w0}$.

It is possible to divide the number of the short sequence by 8, combine the short sequences having the same residuals, and thereby classify the 31 short sequences as 8 groups. That is, the number of the short sequence is divided by 8, the short sequence having the residual 0 is set to belong to the group 0, the short sequence having the residual 1 is set to belong to the group 1, the short sequence having the residual 2 is set to belong to the group 2, the short sequence having the residual 3 is set to belong to the group 3, the short sequence having the residual 4 is set to belong to the group 4, the short sequence having the residual 5 is set to belong to the group 5, the short sequence having the residual 6 is set to belong to the group 6, the short sequence having the residual 7 is set to belong to the group 7, a scrambling code is mapped on each group, and the scrambling code mapped on the group to which the first short sequence belongs is determined to be $S_{w0}$.

As expressed in Equation 6, the respective elements of the second sequence $c_1$ according to the second method for generating the secondary synchronization signal are products of the respective elements of the second short sequence w1 and the corresponding respective elements of $S_{w0}$.

$$c_1 = [w1(0)S_{w0}(0), w1(1)S_{w0}(1), \ldots, w1(m)S_{w0}(m), \ldots, w1(30)S_{w0}(30)] \quad \text{[Equation 6]}$$

Here, m is an index of the odd subcarrier used for the synchronization channel.

The scrambling sequence $P_{j,2}$ for scrambling the third short sequence w2 is given as $P_{j,2} = [P_{j,2}(0), P_{j,2}(1), \ldots P_{j,2}(k) \ldots P_{j,2}(30)]$, and j (j=0, 1, 2) is a number of a cell identifying sequence allocated to the primary synchronization channel. Therefore, $P_{j,2}$ is determined by the primary synchronization signal. $P_{j,2}$ is a known value when the terminal demaps the code in order to know the cell ID group and the frame boundary.

As expressed in Equation 7, the respective elements of the third sequence $c_2$ according to the second method for generating the secondary synchronization signal are products of the respective elements of the third short sequence w2 and the corresponding respective elements of $P_{j,2}$.

$$c_2 = [w2(0)P_{j,2}(0), w2(1)P_{j,2}(1), \ldots, w2(k)P_{j,2}(k), \ldots, w2(30)P_{j,2}(30)] \quad \text{[Equation 7]}$$

Here, k is an index of the even subcarrier used for the synchronization channel.

The scrambling sequence $S_{w2}$ for scrambling the fourth short sequence is given as $S_{w2} = [S_{w2}(0), S_{w2}(1), S_{w2}(m), \ldots S_{w2}(30)]$, and $S_{w2}$ is determined by the third short sequence w2.

In this instance, it is possible to combine the short sequences into a group and determine $S_{w2}$ according to the short sequence group to which the third short sequence belongs.

For example, since the length of the short sequence according to the exemplary embodiment of the present invention is 31, there are 31 short sequences. Therefore, the 0 to 7 short sequences are set to belong to the group 0, the 8 to 15 short sequences are set to belong to the group 1, the 16 to 23 short sequences are set to belong to the group 2, the 24 to 30 short sequences are set to belong to the group 3, a scrambling code is mapped on each group, and the scrambling code mapped on the group to which the third short sequence belongs is determine to be $S_{w2}$.

It is also possible to divide the number of the short sequence by 8, combine the short sequences with the same residual, and classify the 31 short sequences as 8 groups. That is, the number of the short sequence is divided by 8, the short sequence with the residual 0 is set to belong to the group 0, the short sequence with the residual 1 is set to belong to the group 1, the short sequence with the residual 2 is set to belong to the group 2, the short sequence with the residual 3 is set to belong to the group 3, the short sequence with the residual 4 is set to belong to the group 4, the short sequence with the residual 5 is set to belong to the group 5, the short sequence with the residual 6 is set to belong to the group 6, the short sequence with the residual 7 is set to belong to the group 7, a scrambling code is mapped on each group, and the scrambling code mapped on the group to which the third short sequence belongs is determined to be $S_{w2}$.

As expressed in Equation 8, the respective elements of the fourth sequence $c_3$ according to the second method for generating the secondary synchronization signal are the products of the respective elements of the fourth short sequence and the corresponding respective elements of $S_{w2}$.

$$c_3 = [w3(0)S_{w2}0, w3(1)S_{w2}(1), \ldots, w3(m)S_{w2}(m), \ldots w3(30)S_{w2}(30)] \quad \text{[Equation 8]}$$

Here, m is an index of the odd subcarrier used for the synchronization channel.

Here, it is given that $P_{j,1} = P_{j,2}$, and $w0 \neq w1 \neq w2 \neq w3$ or $w0 = w3$, $w1 = w2$. In this case, the cell group and frame identifying information are mapped on the combination of the first to fourth short sequences, and the number of descrambling hypotheses of the terminal for the scramble of the secondary synchronization channel defined by the cell identifying sequence number of the primary synchronization channel is reduced.

It is set that $P_{j,1} \neq P_{j,2}$ and $w0 = w2$, $w1 = w3$. In this case, cell group information is mapped on the combination of the first short sequence and the second short sequence, and frame synchronization information is mapped on the scrambling sequences $P_{j,1}$ and $P_{j,2}$ of the secondary synchronization channel defined by the cell identifying sequence number of the primary synchronization channel. The number of descrambling hypotheses of the terminal for the scramble of the secondary synchronization channel defined by the cell identifying sequence number of the primary synchronization channel is increased, but the complexity is reduced since the combination of cell group identifying sequences is reduced to half.

The frequency mapper 430 maps the secondary synchronization signal and the transmission traffic data generated by the synchronization signal generator 420 in the time and frequency domains to generate a frame of the downlink signal (S530).

The OFDM transmitter 440 receives the frame of the downlink signal and transmits it through the transmitting antenna (S540).

A method for a terminal to search the cell by using a downlink signal according to an exemplary embodiment of the present invention will now be described with reference to FIG. 8 to FIG. 10.

Figure 8:
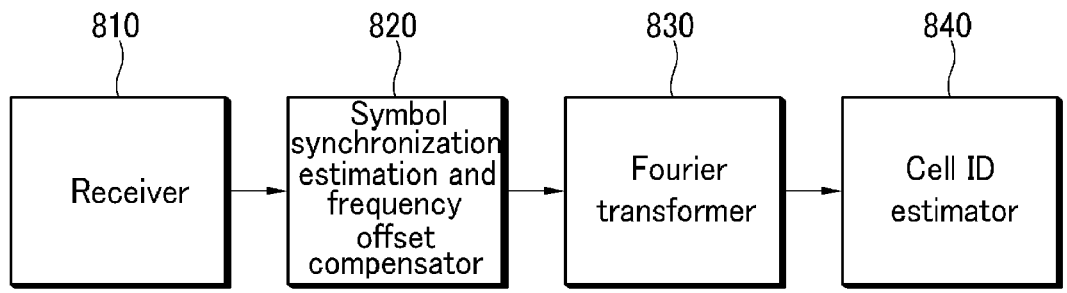
FIG. 8 shows a block diagram of a cell searching device according to an exemplary embodiment of the present invention.
Figure 9:
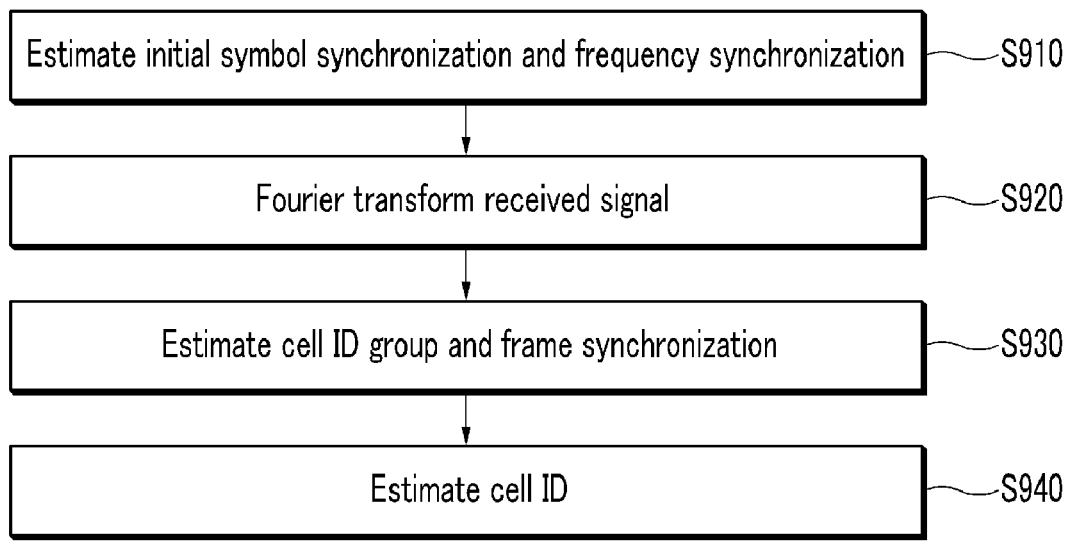
FIG. 9 shows a flowchart of a cell searching method according to a first exemplary embodiment of the present invention.
Figure 10:
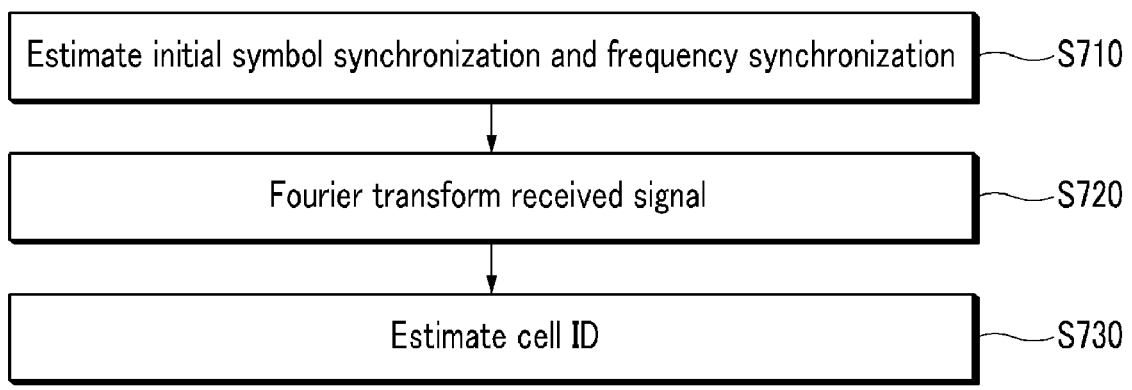
FIG. 10 shows a flowchart of a cell searching method according to a second exemplary embodiment of the present invention.

FIG. 8 shows a block diagram of a cell searching device according to an exemplary embodiment of the present invention, FIG. 9 shows a flowchart of a cell searching method according to a first exemplary embodiment of the present invention, and FIG. 10 shows a flowchart of a cell searching method according to a second exemplary embodiment of the present invention.

As shown in FIG. 8, the cell searching device includes a receiver 810, a symbol synchronization estimation and frequency offset compensator 820, a Fourier transformer 830, and a cell ID estimator 840.

A cell searching method according to a first exemplary embodiment of the present invention will now be described with reference to FIG. 9.

As shown in FIG. 9, the receiver 810 receives the frame from the base station, and the symbol synchronization estimation and frequency offset compensator 820 filters the received signal by the bandwidth allocated to the synchronization channel, correlates the filtered received signal and a plurality of predetermined primary synchronization signals to acquire symbol synchronization, and estimates frequency synchronization to compensate for a frequency offset (S910). The symbol synchronization estimation and frequency offset compensator 820 correlates the filtered received signal and a plurality of predetermined primary synchronization signals, estimates the time having the greatest correlation value to be symbol synchronization, and transmits the number of the primary synchronization signal having the greatest correlation value to the cell ID estimator 840. In this instance, frequency offset is compensated in the frequency domain after Fourier transform.

The Fourier transformer 830 performs a Fourier transform process on the received signal with reference to the symbol synchronization estimated by the symbol synchronization estimation and frequency offset compensator 820 (S920).

The cell ID estimator 840 correlates the Fourier transformed received signal and a plurality of predetermined secondary synchronization signals to estimate a cell ID group and frame synchronization (S930). The cell ID estimator 840 correlates the Fourier transformed received signal and a plurality of secondary synchronization signals that are generated by applying $P_{j,1}$ and $P_{j,2}$ that are determined by the primary synchronization signal corresponding to the number of the primary synchronization signal transmitted by the symbol synchronization estimation and frequency offset compensator 820 to Equation 5 to Equation 8, and estimates the frame synchronization and the cell ID group by using the secondary synchronization signal having the greatest correlation value. In this instance, when the synchronization channel symbol in one frame is provided within one slot or one OFDM symbol, there is no need of additionally acquiring frame synchronization since the symbol synchronization becomes the frame synchronization.

The cell ID estimator 840 estimates the cell ID by using the number of the primary synchronization signal transmitted by the symbol synchronization estimation and frequency offset compensator 820 and the estimated cell ID group (S940). In this instance, the cell ID estimator 840 estimates the cell ID by referring to the mapping relation of the predetermined primary synchronization signal number, cell ID group, and cell ID.

The estimated cell ID information can be checked by using scrambling sequence information included in the pilot symbol interval.

A cell searching method according to a second exemplary embodiment of the present invention will now be described with reference to FIG. 10.

The receiver 810 receives the frame from the base station, and the symbol synchronization estimation and frequency offset compensator 820 filters the received signal by the bandwidth allocated to the synchronization channel, correlates the filtered received signal and a plurality of predetermined primary synchronization signals to acquire symbol synchronization, and estimates frequency synchronization to compensate the frequency offset (S710). The symbol synchronization estimation and frequency offset compensator 820 correlates the filtered received signal and a plurality of predetermined primary synchronization signals to estimate the time having the greatest correlation value to be symbol synchronization, and transmits a plurality of correlation values that are generated by correlating the primary synchronization signals and the filtered received signal to the cell ID estimator 840. In this instance, the frequency offset can be compensated in the frequency domain after Fourier transform.

The Fourier transformer 830 performs a Fourier transform process on the received signal with reference to the symbol synchronization estimated by the symbol synchronization estimation and frequency offset compensator 820 (S720).

The cell ID estimator 840 estimates the cell ID by using a plurality of correlation values transmitted by the symbol synchronization estimation and frequency offset compensator 820, the Fourier transformed received signal, and correlation values of a plurality of predetermined secondary synchronization signals (S730). The cell ID estimator 840 correlates the Fourier transformed received signal and a plurality of secondary synchronization signals that are generated by applying $P_{j,1}$ and $P_{j,2}$ that are determined according to the corresponding primary synchronization signals to Equation 5 to Equation 8, and finds the secondary synchronization signal having the greatest correlation value, regarding a plurality of respective primary synchronization signals.

The cell ID estimator 840 combines the correlation value of the corresponding primary synchronization signal transmitted by the symbol synchronization estimation and frequency offset compensator 820 and the correlation value of the secondary synchronization signal having the greatest correlation value with the Fourier transformed received signal from among a plurality of secondary synchronization signals that are generated by applying $P_{j,1}$ and $P_{j,2}$ that are determined by the corresponding primary synchronization signal to Equation 5 to Equation 8, regarding a plurality of respective primary synchronization signals.

The cell ID estimator 840 estimates the frame synchronization and the cell ID group by using the secondary synchronization signal having the greatest value generated by combining the correlation value of the primary synchronization signal and the correlation value of the secondary synchronization signal. The cell ID estimator 840 estimates the cell ID by using the estimated cell ID group and the primary synchronization signal having the greatest value generated by combining the correlation value of the primary synchronization signal and the correlation value of the secondary synchronization signal. In this instance, the cell ID estimator 840 estimates the cell ID by referring to the mapping relation of the predetermined primary synchronization signal number, cell ID group, and cell ID.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of searching a cell by a mobile station in a wireless communication system, the method comprising:
   receiving a downlink frame including a first synchronization signal and a second synchronization signal; and
   identifying a cell by using the first synchronization signal and the second synchronization signal,
   wherein the second synchronization signal includes a first short sequence scrambled with a first scrambling sequence and a second short sequence scrambled with a second scrambling sequence, the first scrambling sequence is determined based on the first synchronization signal, the wireless communication system uses a plurality of short sequences which are classified into a plurality of groups, and the second scrambling sequence is determined based on a group to which the first short sequence belongs, and the first and second short sequences indicate cell group information.

2. The method of claim 1, wherein the scrambled first short sequence and the scrambled second short sequence are alternately disposed on a plurality of subcarriers in the downlink frame.

3. The method of claim 1, the identifying the cell comprises:
   identifying a cell group by using the second synchronization signal; and
   identifying the cell in the cell group by using the first synchronization signal.

4. The method of claim 1, wherein the downlink frame includes a plurality of slots, and each slot includes a plurality of symbols, and
   the first synchronization signal is provided at the last symbol of the slot, and the second synchronization signal is provided at a symbol before the last symbol of the slot.

5. A method of searching a cell by a mobile station in a wireless communication system, the method comprising:
   receiving a downlink frame including a first synchronization signal and two second synchronization signals; and
   identifying a cell by using the first synchronization signal and at least one of the two second synchronization signals,
   wherein one of the two second synchronization signals includes a first short sequence scrambled with a first scrambling sequence and a second short sequence scrambled with a second scrambling sequence,
      the other of the two second synchronization signals includes the second short sequence scrambled with the first scrambling sequence and the first short sequence scrambled with a third scrambling sequence, the first scrambling sequence is determined based on the first synchronization signal, the wireless communication system uses a plurality of short sequences which are classified into a plurality of groups, the second scrambling sequence is determined based on a group to which the first short sequence belongs, and the third scrambling sequence is determined based on a group to which the second short sequence belongs, and the first and second short sequences indicate cell group information.

6. The method of claim 5, wherein in the one second synchronization signal, the first short sequence scrambled with the first scrambling sequence and the second short sequence scrambled with the second scrambling sequence are alternately disposed on a plurality of subcarriers of the downlink frame, and
   in the other second synchronization signal, the second short sequence scrambled with the first scrambling sequence and the first short sequence scrambled with the third scrambling sequence are alternately disposed on a plurality of subcarriers of the downlink frame.

7. The method of claim 5, the identifying the cell comprises:
   identifying a cell group by using at least one of the two second synchronization signals; and
   identifying the cell in the cell group by using the first synchronization signal.

8. An apparatus for searching a cell, the apparatus comprising a hardware processor configured to execute:
   receiving a downlink frame including a first synchronization signal and a second synchronization signal; and
   identifying, a cell by using the first synchronization signal and the second synchronization signal,
   wherein the second synchronization signal includes a first short sequence scrambled with a first scrambling sequence and a second short sequence scrambled with a second scrambling sequence,
      the first scrambling sequence is determined based on the first synchronization signal, the wireless communication system uses a plurality of short sequences which are classified into by a plurality of groups, and the second scrambling sequence is determined based on a group to which the first short sequence belongs, and
      the first and second short sequences indicate cell group information.

9. The apparatus of claim 8, wherein the scrambled first short sequence and the scrambled second short sequence are alternately disposed on a plurality of subcarriers in the downlink frame.

10. The apparatus of claim 8, wherein the hardware processor is configured to execute identifying a cell group by using the second synchronization signal, and identifying the cell in the cell group by using the first synchronization signal.

11. The apparatus of claim 8, wherein the downlink frame includes a plurality of slots, and each slot includes a plurality of symbols, and the first synchronization signal is provided at the last symbol of the slot, and the second synchronization signal is provided at a symbol before the last symbol of the slot.

12. An apparatus for searching a cell, the apparatus comprising a hardware processor configured to execute:
   receiving a downlink frame including a first synchronization signal and two second synchronization signals; and
   identifying a cell by using the first synchronization signal and at least one of the second synchronization signals,
   wherein one of the two second synchronization signals includes a first short sequence scrambled with a first scrambling sequence and a second short sequence scrambled with a second scrambling sequence,
      the other of the two second synchronization signals includes the second short sequence scrambled with the first scrambling sequence and the first short sequence scrambled with a third scrambling sequence,
      the first scrambling sequence is determined based on the first synchronization signal, the wireless communication system uses a plurality of short sequences which are classified into a plurality of groups, the second scrambling sequence is determined based on a group to which the first short sequence belongs, and the third scrambling sequence is determined based on a group to which the second short sequence belongs, and the first and second short sequences indicate cell group information.

13. The apparatus of claim 12, wherein in the one second synchronization signal, the first short sequence scrambled with the first scrambling sequence and the second short sequence scrambled with the second scrambling sequence are alternately disposed on a plurality of subcarriers of the downlink frame, and
   in the other second synchronization signal, the second short sequence scrambled with the first scrambling sequence and the first short sequence scrambled with the third scrambling sequence are alternately disposed on a plurality of subcarriers of the downlink frame.

14. The apparatus of claim 12, wherein the hardware processor is configured to execute identifying a cell group by using at least one of the two second synchronization signals, and identifying the cell in the cell group by using the first synchronization signal.

* * * * *